(12) United States Patent
Nordin et al.

(10) Patent No.: US 8,737,079 B2
(45) Date of Patent: May 27, 2014

(54) ACTIVE PATCH PANEL

(71) Applicant: Panduit Corp, Tinley Park, IL (US)

(72) Inventors: Ronald A. Nordin, Naperville, IL (US); Paul W. Wachtel, Arlington Heights, IL (US); Masud Bolouri-Saransar, Orland Park, IL (US); Robert D. Elliot, Naperville, IL (US); Mysore Purushotham Divakar, San Jose, CA (US); Surrendra Chitti Babu, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 13/745,922

(22) Filed: Jan. 21, 2013

(65) Prior Publication Data

US 2013/0187460 A1 Jul. 25, 2013

Related U.S. Application Data

(63) Continuation of application No. 12/726,412, filed on Mar. 18, 2010, now Pat. No. 8,358,508.

(60) Provisional application No. 61/161,665, filed on Mar. 19, 2009.

(51) Int. Cl.
*H05K 1/14* (2006.01)

(52) U.S. Cl.
USPC .............................. 361/737; 439/49; 439/676

(58) Field of Classification Search
USPC .............................. 361/737; 439/49, 540, 676
See application file for complete search history.

(56) References Cited

U.S. PATENT DOCUMENTS

| | | | |
|---|---|---|---|
| 5,349,503 A * | 9/1994 | Blonder et al. | 362/623 |
| 7,142,414 B2 | 11/2006 | Lee et al. | |
| 7,436,824 B2 | 10/2008 | Pepenella | |
| 7,580,637 B2 | 8/2009 | El-Ahmadi et al. | |
| 8,419,465 B2 * | 4/2013 | Jacks et al. | 439/491 |
| 2005/0089126 A1 | 4/2005 | Zerbe et al. | |
| 2005/0135770 A1 | 6/2005 | McClellan et al. | |
| 2006/0025018 A1 | 2/2006 | Dube et al. | |
| 2007/0132503 A1 * | 6/2007 | Nordin | 327/518 |
| 2007/0255855 A1 | 11/2007 | Knapp et al. | |
| 2009/0257754 A1 | 10/2009 | Theodoras, II et al. | |
| 2010/0158534 A1 | 6/2010 | Honda | |

OTHER PUBLICATIONS

Gennum Corp. "Gennum Delivers Low Power, PCI Express® 2.0, Infiniband Repeater for Systems Interconnects", Apr. 14, 2008, 3 pages.
Nuova Systems "Ethernet Enhancements Supporting I/O Consolidation", Jan. 2008, 4 pages.
Gennum Corp. "Clock & Data Recovery Solutions", 2009, 2 pages.

(Continued)

*Primary Examiner* — Hung S Bui
(74) *Attorney, Agent, or Firm* — Christopher S. Clancy; Yuri Astvatsaturov

(57) ABSTRACT

An active patch panel uses small form factor plus (SFP+) connectivity with a plurality of channels extending between first and second faces of the panel. The channels connect ports on the opposing faces of the panel and are provided with additional electronic elements, such as an equalizer, a clock data recovery element, and a pre-emphasis element. A controller can be connected to the plurality of channels to provide instructions for simultaneous equalization and pre-emphasis of a plurality of cable assemblies in the same channel.

3 Claims, 21 Drawing Sheets

(56) References Cited

OTHER PUBLICATIONS

Gennum Corp. "Gennum CDRs for SFP+", 2008, 1 page.
Atmel Corp. "8-bit AVR Microcontrollers Application Note", Jun. 2010, 17 pages.
Atmel Corp. "8-bit AVR Microcontroller with 16K/32K/64K Bytes In-System Programmable Flash Summary", Jul. 2010, 28 pages.
Texas Instruments "Adjustable Current-Limited Power Distribution Switches" Feb. 2008 (revised Nov. 2008), 32 pages.
Texas Instruments "11.3-Gbps Cable and PC Board Equalizer" Aug. 2007 (revised Oct. 2007), 28 pages.

* cited by examiner

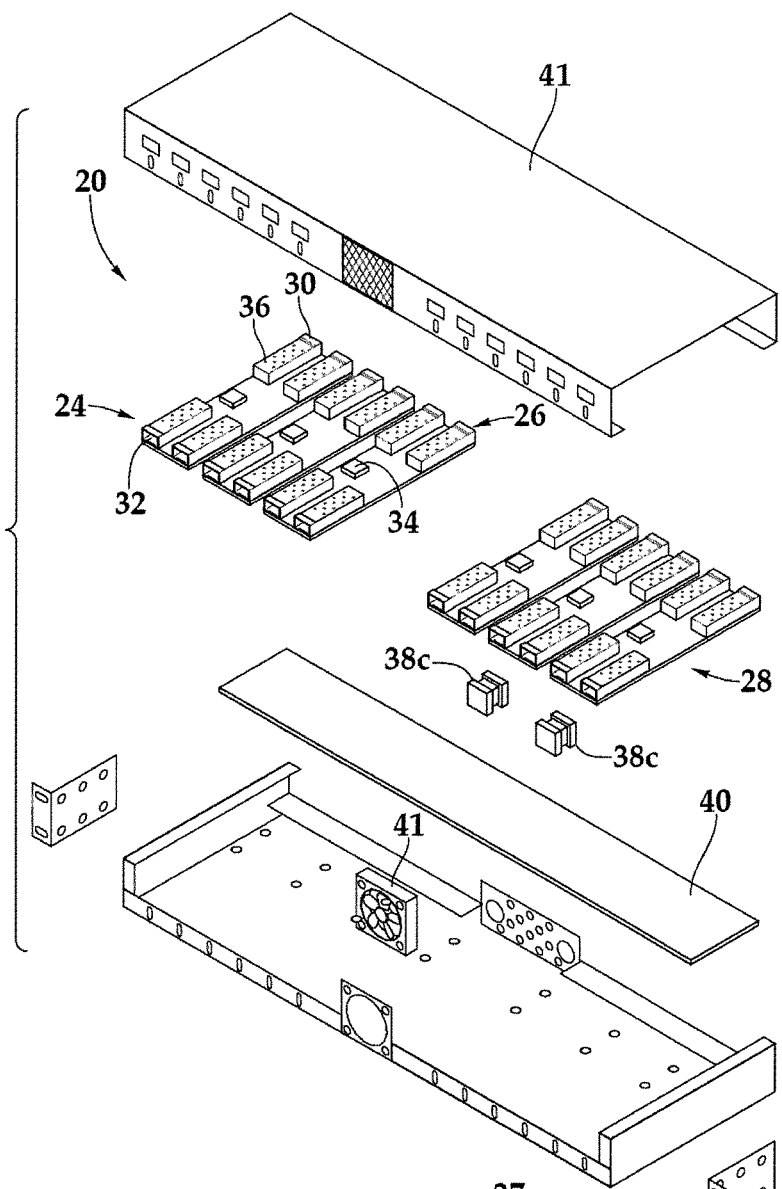
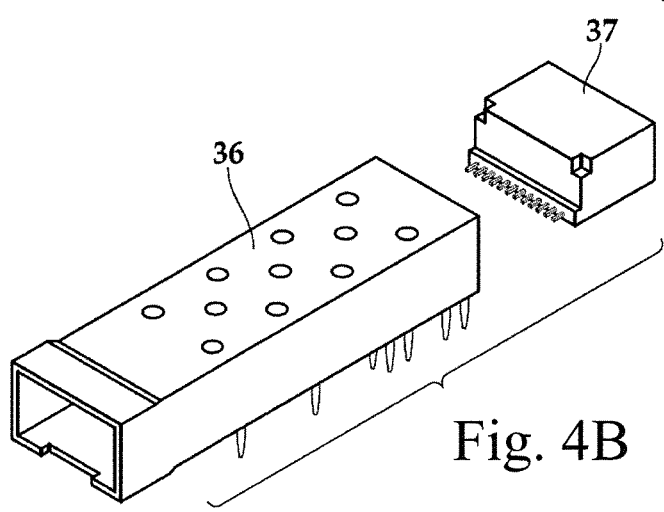

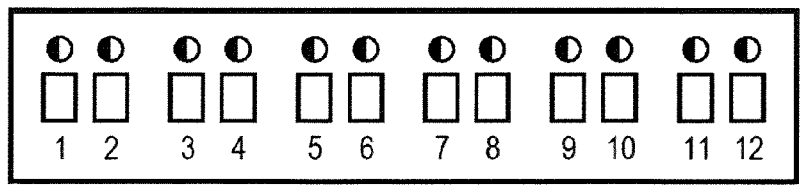
Fig. 14A
MAC States
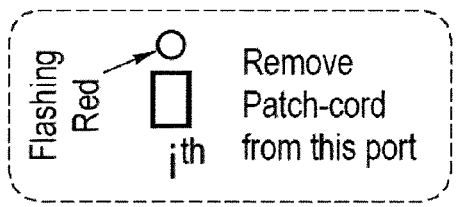
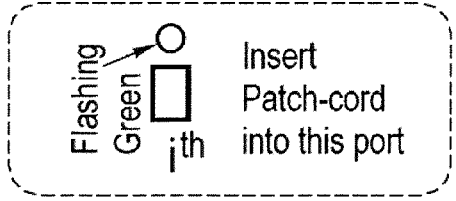
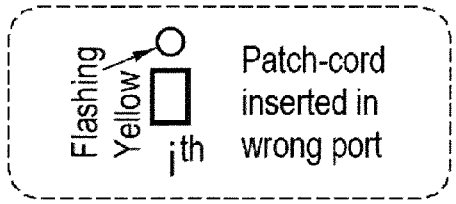
Patch-cord Trace States
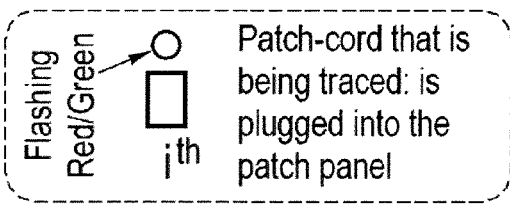
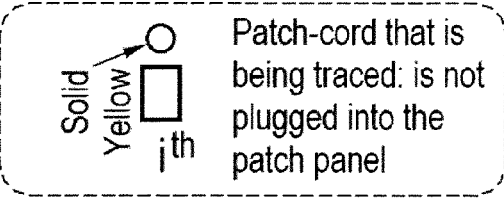
Fig. 14B

ACTIVE PATCH PANEL

CROSS REFERENCE TO RELATED APPLICATIONS

This application is a continuation of U.S. patent application Ser. No. 12/726,412, filed Mar. 18, 2010, which claims priority to U.S. Patent Application No. 61/161,665, filed Mar. 19, 2009, which are hereby incorporated by reference in their entirety.

BACKGROUND OF THE INVENTION

Converged Enhanced Ethernet (CEE) is the term used to describe a set of enhancements to Ethernet that are being developed within the industry and standards bodies. CEE will allow Ethernet to better handle different classes of traffic in the data center, as well as eliminating the risk of packet loss during transmission. These enhancements allow Ethernet to meet the needs not only of the existing Ethernet network portion of the data center but also the storage side by introducing a new protocol called the Fiber Channel over Ethernet (FCoE). FCoE can be deployed without disrupting the legacy Ethernet network. It supports I/O consolidation of Ethernet and storage traffic at the rack level, reducing the number of adapters, cables, switches and transceivers that each server must support, while protecting the investment in existing Ethernet infrastructure.

Even though Ethernet is the dominant data communications standard today, due to early limitations on storage networking in the Ethernet standard, Fiber Channel (FC) is the widely used protocol for storage area networks (SANs). Therefore, servers in the datacenter require connections to both Ethernet and FC networks where data must be ensured to flow seamlessly. The current practice in data centers enables this seamless flow by the use of separate adapter cards, cables and switches, all leading to increased costs. FCoE attempts to solve this problem by encapsulating FC frames within an Ethernet frame and hence defining a new FCoE frame type. This encapsulation is shown conceptually in FIG. 1. Converged traffic is supported between the servers (which have converged network adapters (CNAs)) and an FCoE switch, and separated out on the uplink side of the switch to either the Ethernet or storage areas of the data center.

The current state of the art in these types of deployment are point-to-point connections between the servers and the FCoE switch using small form-factor pluggable plus (SFP+) copper interconnects predominantly in a top-of-rack (TOR) configuration, though end-of-row (FOR), and/or middle-of-row (MOR) configurations are utilized in the data center. The reason these copper cables are used in a point to point fashion has to do with the required electrical performance. The cables could not meet these performance requirements if they were used in a structured cabling environment (where the passive patch panels would be used). Although structured cabling is greatly preferred over point to point configurations, these performance requirements are a barrier to the adoption of structured cabling. Additionally, due to cable reach limitations of SFP+ copper interconnects (~7-10 m for passive cables and possibly up to 20 m for active cables), these configurations limit the reach of EOR/TOR/MOR deployment, forcing the addition of more switches. There are no solutions available in the market today to extend the reaches of SFP+ copper interconnects either in point-to-point or point-to-multipoint connections without the use of switches. Switches are relatively expensive hardware; further, installation labor costs, and also extensive reconfiguration (moves, adds and changes: MACs) labor costs add to the overall expense.

In high performance network applications (e.g., 10 Gbps (gigabit per second) Ethernet), SFP+ style connectivity is preferred due to its small form factor allowing high density port switches to be implemented. It is preferred over 10 G BASE-T media primarily because of the power dissipation required for this style media and associated latency. It is also preferred over other 10 Gbps implementations that rely on parallel transmission such as CX4, InfiniBand, or PCI Express. SFP+ connectivity employs a serial transmission of 10 Gbps which requires many fewer I/O pins and thereby allows for greater density in connected hardware. Previously, only optical based SFP+ connectivity has been used. Recently copper-based SFP+ connectivity has been of interest due to the low cost of this media type, and because it utilizes the same mechanical interface as the optical SFP+ interface. A disadvantage of copper-based SFP+ media is the cable length limitation. The cable length limit is on the order of approximately 7-10 m for a passive cable. Systems require that some interconnects go beyond 10 m, and this causes a problem for SFP+ copper based media implementation.

BRIEF DESCRIPTION OF THE DRAWINGS

FIG. 4A is an exploded view of an embodiment of an active patch panel according to the present invention.

FIG. 4B is an exploded view of the mating connector and EMI cage of FIG. 4A.

FIGS. 14A-B illustrate a schematic of the panel-mounted LEDs on the SFP+ active patch panel and their functionality.

Corresponding reference characters indicate corresponding parts throughout the several views. The examples set out herein illustrate embodiments of the invention, and such examples are not to be construed as limiting the scope of the invention in any manner.

DETAILED DESCRIPTION OF THE INVENTION

According to embodiments of the present invention, an active patch panel is provided for use with SFP+ connectors. The active patch panel enables the incorporation of a structured cabling architecture (as opposed to a point to point architecture) into these high performance systems. This facilitates the adoption of this media type and also improves the management of this media type in the network. The active patch panel can also easily support cable lengths up to 10 meters between panels and can support longer length cables through selection of key parameters in the transmit and receive electronics within the panel. Longer total communication length can be obtained by cascading active panels together, which may increase the total communication length to a very long length (many 100's of meters). Active panels according to some embodiments of the present invention can provide other distinguishing and useful features such as: enabling physical layer management, allowing use of both fiber and copper media, and connectivity management, which are discussed herein.

Figure 1:
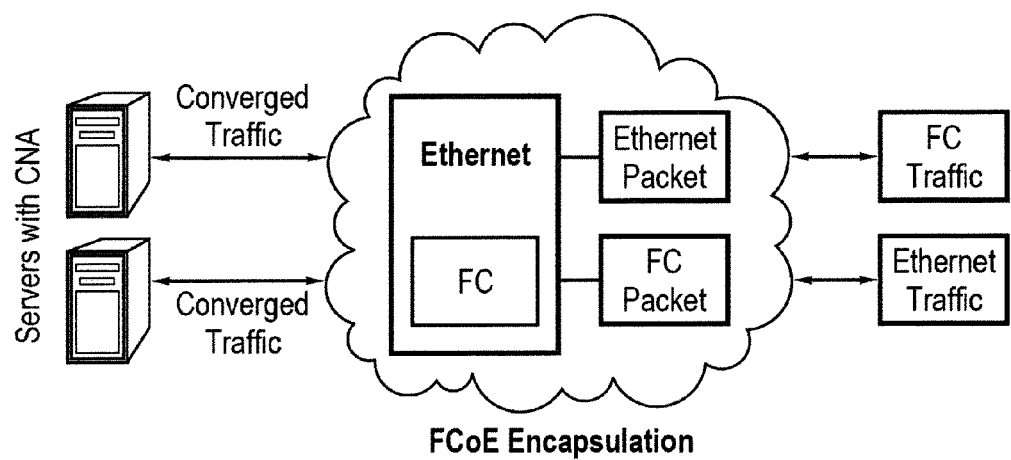
FIG. 1 is a conceptual depiction of FCoE.
Figure 2:
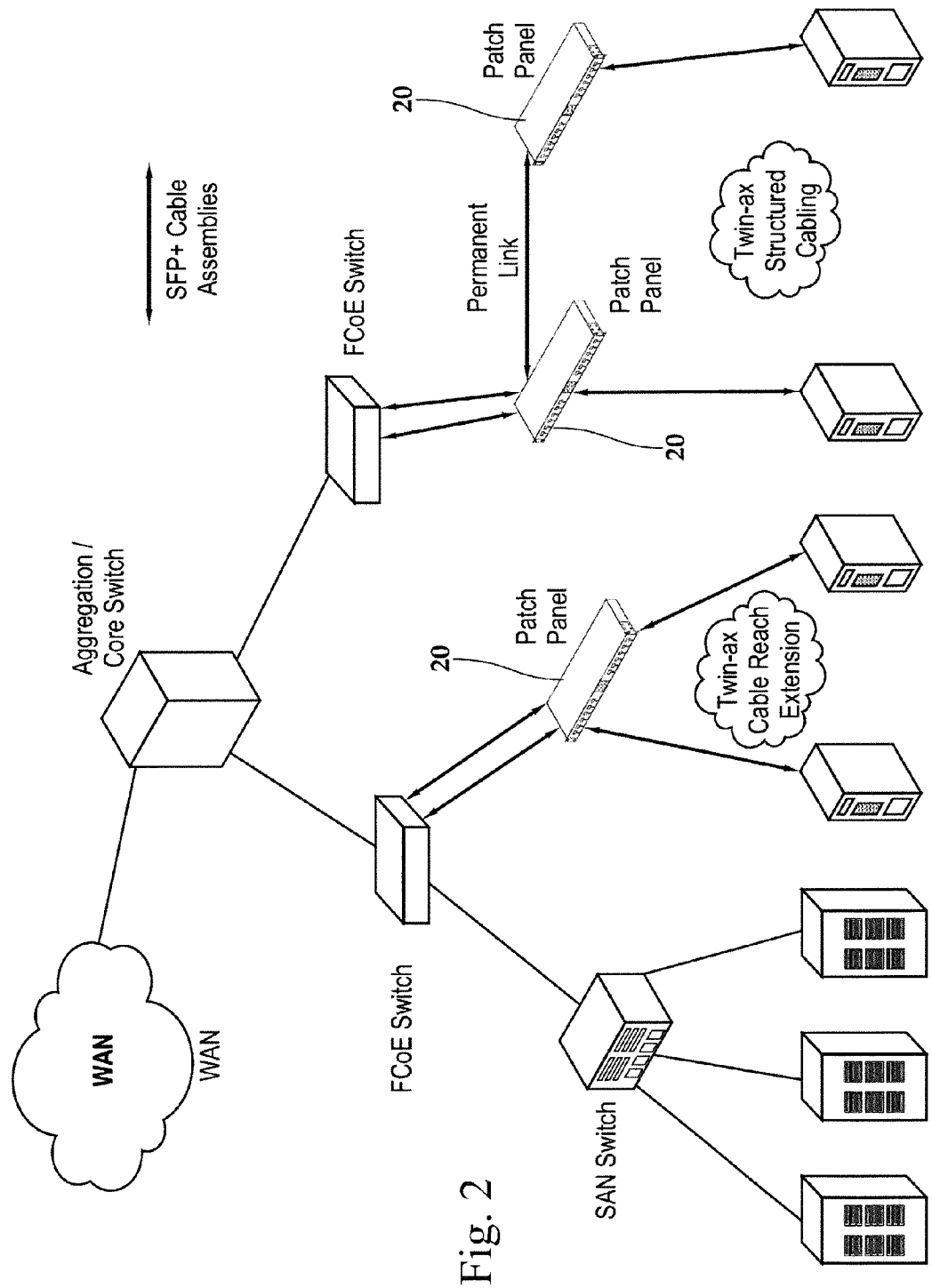
FIG. 2 is a schematic diagram indicating possible locations of SFP+ active patch panels (PP) and the SFP+ patchcords.

FIG. 2 illustrates a CEE network, showing potential locations for an SFP+ patch panel 20, according to the present invention.

Figure 3:
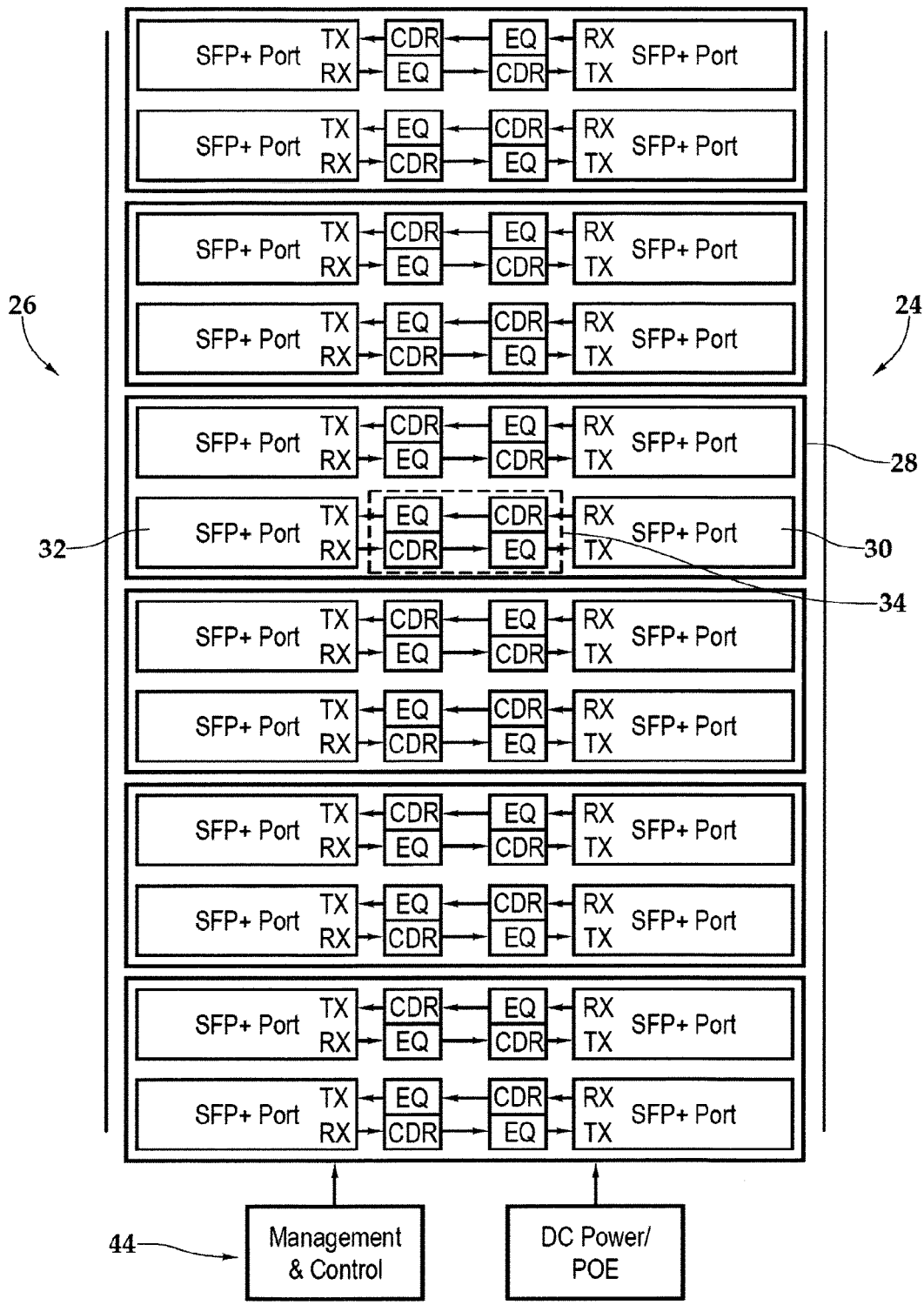
FIG. 3 is a schematic view of the functional architecture of the patch panel for copper twin-ax structured cabling in FCoE.
Figure 5:
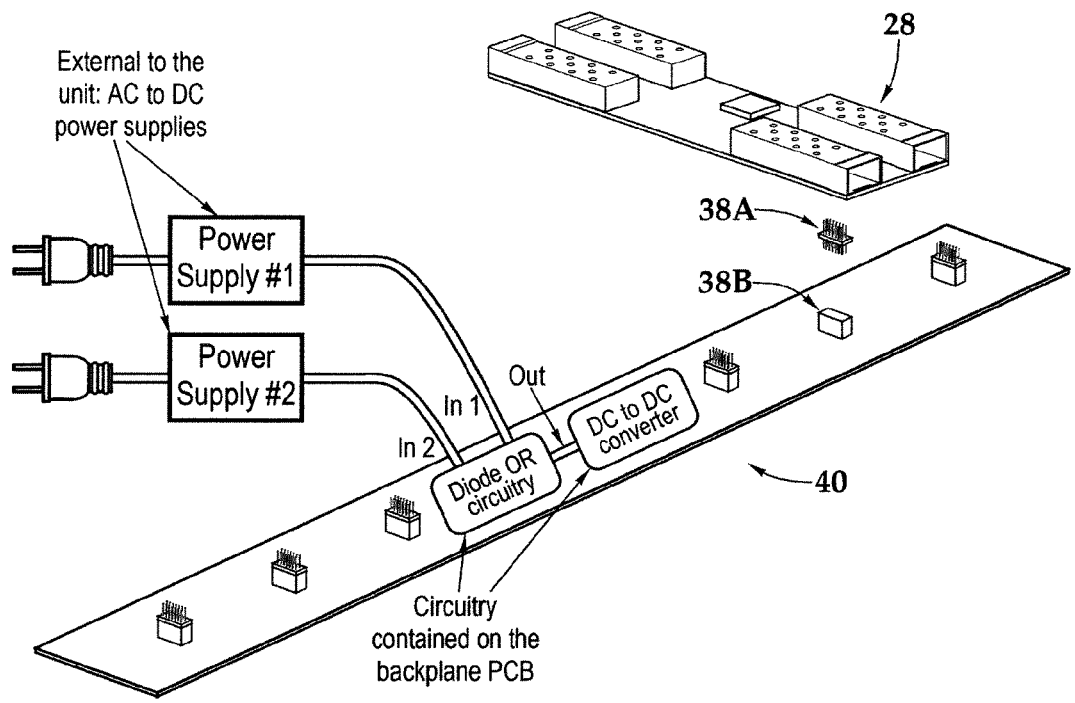
FIG. 5 is an exploded view of an embodiment of a backplane PCB and the power connections for the dual channel card assembly.

FIG. 3 is a functional block diagram of an active patch panel 20 for copper twin-ax structured cabling in FCoE. Referring to FIGS. 3-6, patch panel 20 includes a multi-port housing (top and bottom covers in FIG. 4) with an entrance face 24 and an exit face 26. A plurality of dual channel card assemblies 28 extend between entrance face 24 and exit face 26. Each of the dual channel card assemblies 28 includes two channels, each with a first connector 30 at entrance face 24 which is electrically connected to a second connector 32 at exit face 26, via transceiver circuitry 34. Although multiport housing 22 is described as having "entrance" and "exit" faces consistent with conventional patch panel nomenclature, patch panel 20 in general, and particularly dual channel card assemblies 28, are bi-directional. The transceiver or repeater 34 is in the form of electronic circuitry which provides transmit (Tx), receive (Rx), signal pre-emphasis (pre-Emph), and equalization (EQ), along with clock data recovery (CDR).

The patch panel 20 shown is a one rack unit (1 RU) solution with input ports on the backside of the panel and output on the front. The design of the connection channel (back to front) allows for the number of ports to be installed and configured per user requirements. It also allows two or more SFP+ copper cable assemblies to be cascaded together and installed in a structured cabling environment for efficient cable management.

An exploded view of the patch panel 20 is shown in FIGS. 4A and 4B. Dual channel card assembly 28 includes four SFP+ mating connectors 37 (hidden inside the SFP+EMI cages 36), along with SFP+EMI cages 36 (also shown in FIG. 4B) and the electronic components 34 that perform 10 Gbps pass through, control, power management, and filtering functions. Although the channel card assembly shows a two-channel configuration, single- or multi-channel card assemblies can also be designed with exactly the same, or similar, functionality.

FIG. 4A also shows the overall packaging concept of the patch panel. The dual channel card assemblies are mounted to the bottom cover of the panel and also mate via the control and power distribution connectors 38A (a header that is mounted on the dual channel card assembly) and 38B (a socket that is mounted on the backplane) on the backplane PCB 40 (see FIG. 5). Redundant input AC to DC power supplies are connected to the backplane PCB through two different power connectors 38C shown in FIG. 4A which connect to a power ORing circuit to increase the reliability of the input power (see FIG. 5). This reliable power is than connected to a DC to DC converter which supplies power to the unit's electronics. A cooling fan 41 is preferably provided to draw cool air into the panel from a cool aisle of a rack assembly, as is shown in FIG. 4A.

Figure 6:
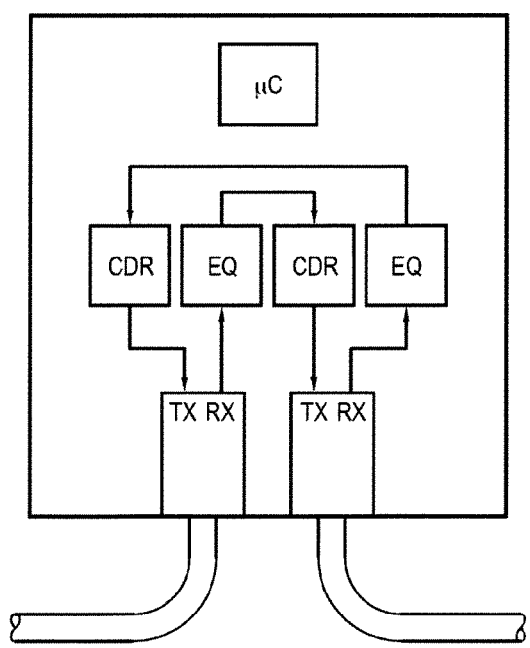
FIG. 6 is a functional block diagram of a single channel in the patch panel.

FIG. 6 shows the functional architecture of one channel in the patch panel. The transceiver function is depicted in functional blocks CDR and EQ. The EQ block represents the equalization stage where the received signal losses are equalized according to their frequency. The CDR block represents the clock and data recovery stage where the received signal's clock and data are recovered. CDR along with pre-emphasis resets the total signal jitter to near zero while generating an amplified signal for output to the next termination point of the SFP+ copper cable. Depending on available chip components, some functions (EQ, CDR) shown in FIG. 6 can be combined into one chip component or in separate chips.

The microcontroller performs any necessary configurations of the EQ or CDR and provides equalizer and CDR/pre-emphasis elements with diagnostic information regarding the dual channel card assembly and the SFP+ cables inserted into the channel. The diagnostic information primarily addresses cable length and can provide information regarding transceiver temperature, and particular voltage levels when the appropriate sensors are integrated into the unit at specific points to be monitored.

Figure 7:
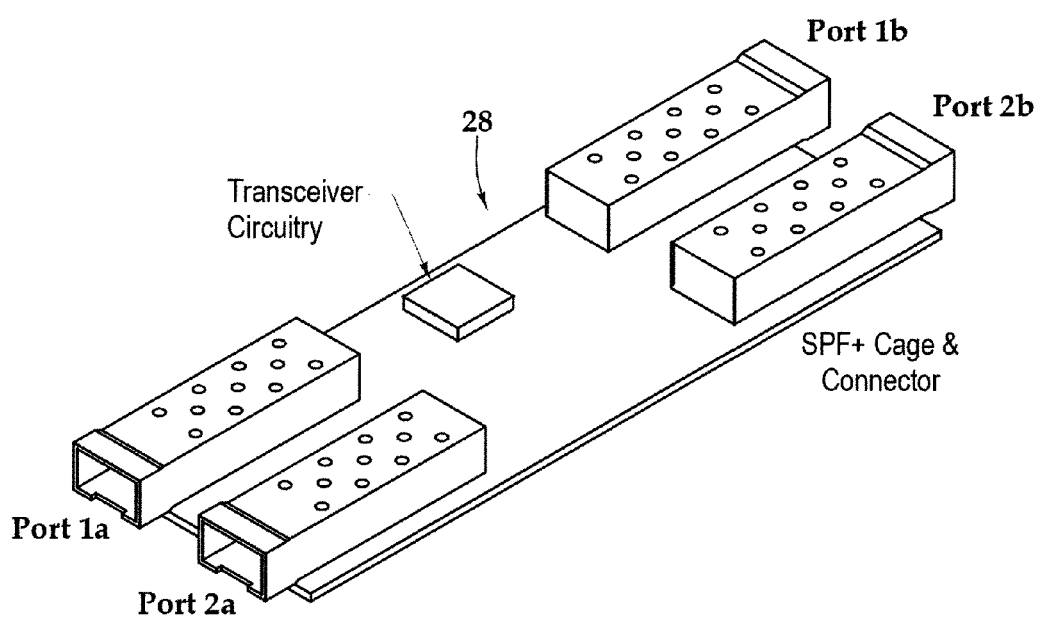
FIG. 7 is an assembled perspective view of the dual channel card assembly.
Figure 8A:
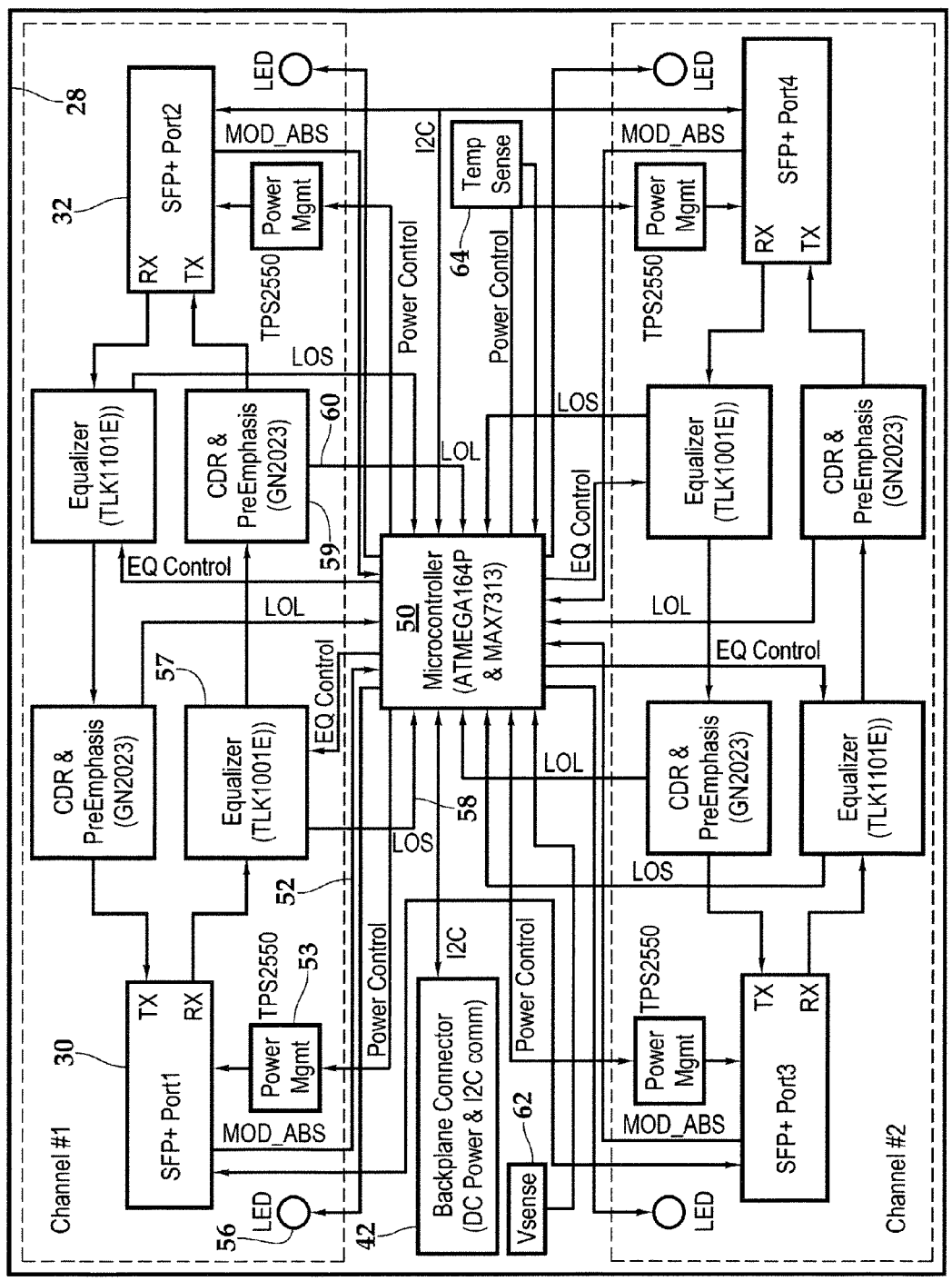
FIG. 8A is a detailed block diagram of the dual channel card assembly of the SFP+ active patch panel.
Figure 8B:
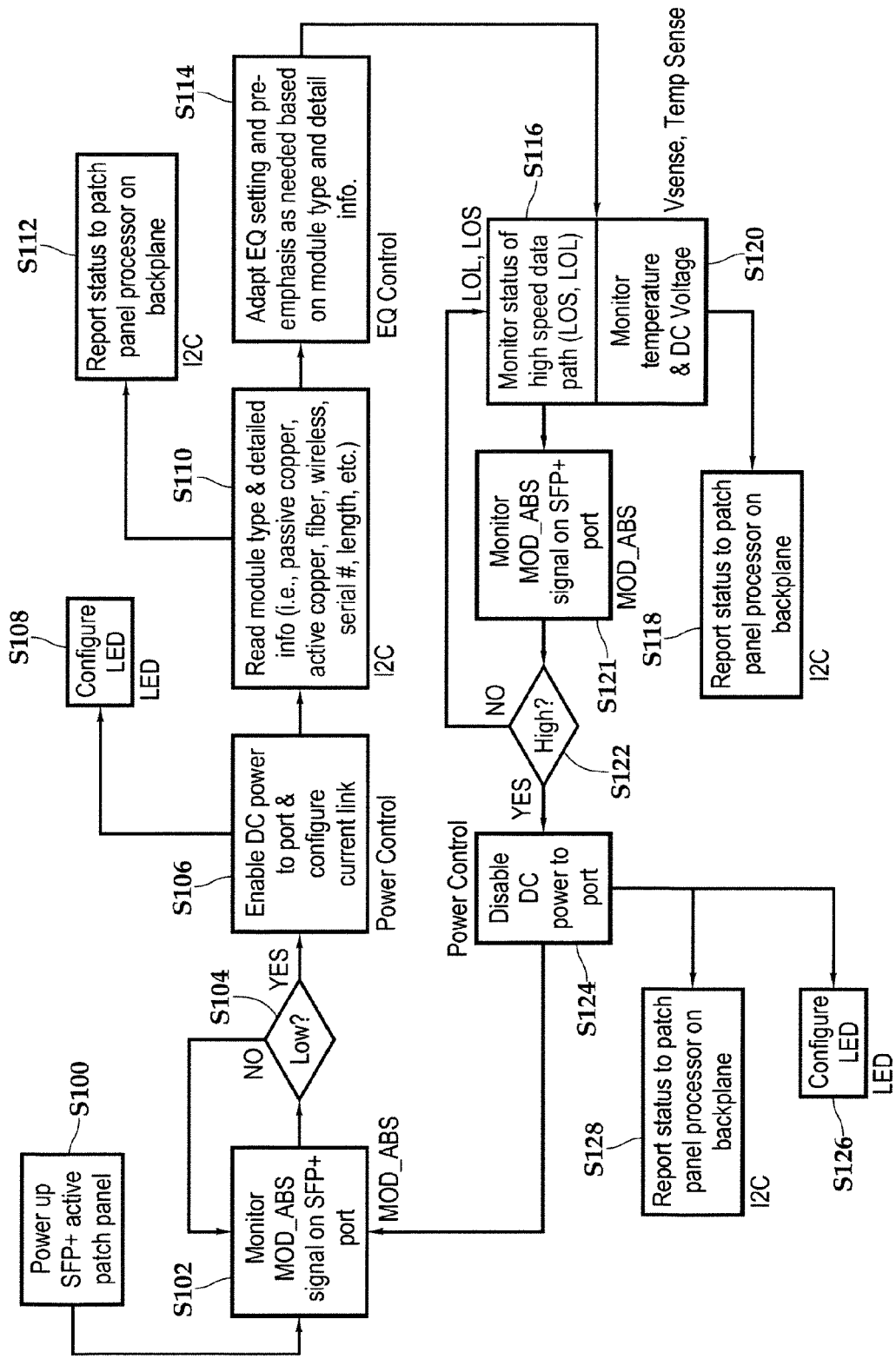
FIG. 8B is a detailed flow chart of microprocessor function and operation of a single SFP+ port on a dual channel card assembly.

The assembled view of the dual channel card assembly 28 shown in FIG. 7 is ideally suited for factory assembly. Additionally, a patch panel according to the present invention can be assembled with all six dual channel card assemblies included or a subset of them to match a customer's specific need. FIGS. 8A-11 describe the dual channel card assemblies 28 in more detail. The SFP+ active patch panel according to some embodiments is a 12 channel unit with 12 SFP+ ports in the front of the unit and 12 ports in the back of the unit. A channel is defined as having two ports, one in the front and one in the back, with active electronic circuitry in-between the two ports (in other embodiments, the channels can also be on the same face of the panel, either side by side or stacked one above the other). The panel includes six dual channel card assemblies 28 that mount onto a backplane circuit board 40. A single dual channel card assembly's detailed block diagram is shown in FIG. 8A and a flowchart illustrating one method of implementing the functionality of one SFP+ port is shown in FIG. 8B. A description of this functional flowchart FIG. 8B, with reference to FIG. 8A, follows.

Figure 9A:
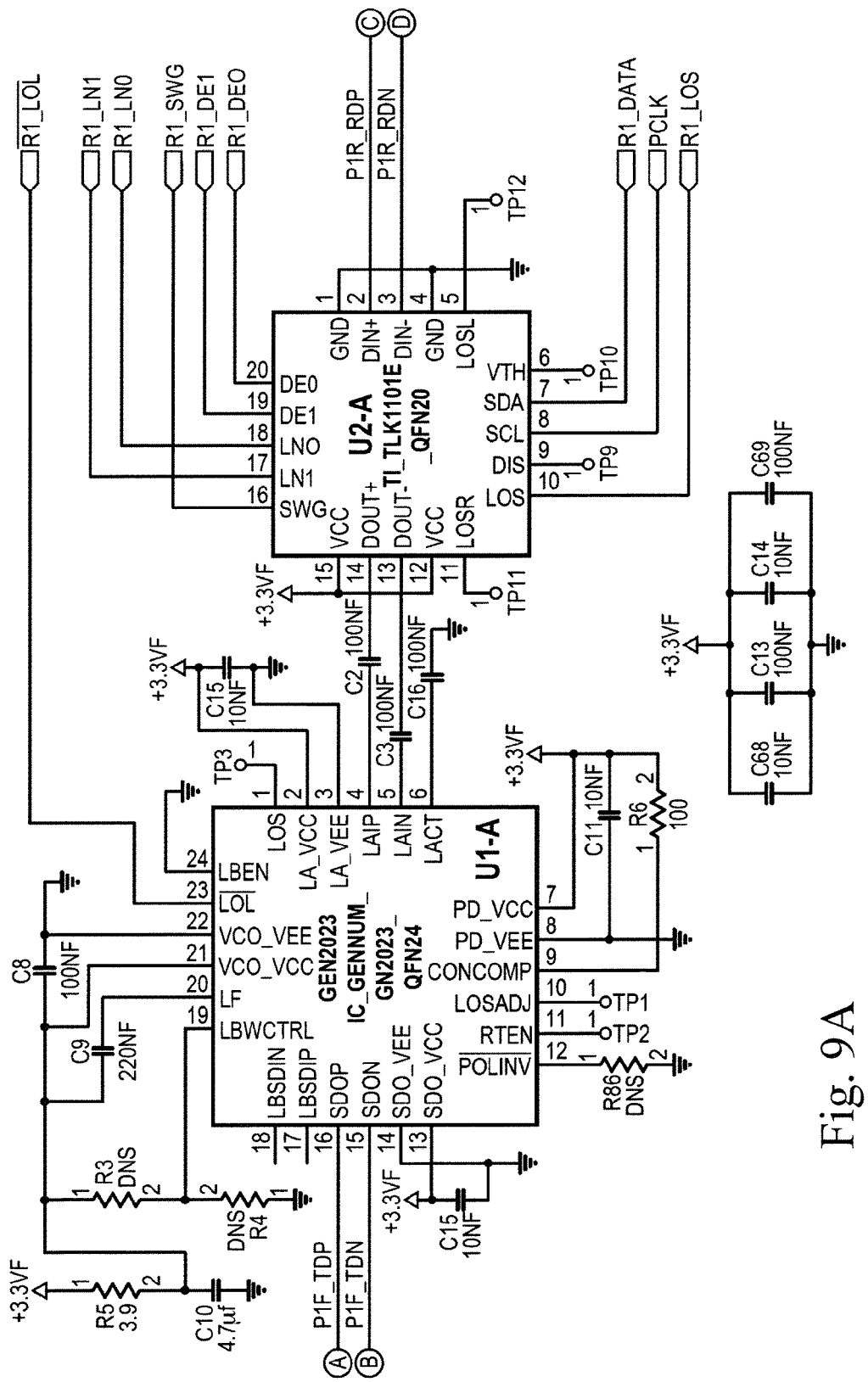
FIGS. 9A-C illustrate a schematic of one of the channels of the dual channel card assembly showing the connectivity to the transmit/receive chip sets. Due to the size of the illustration, the schematic is shown in three figures, with the indicators A-H showing connections across different figures.
Figure 9B:
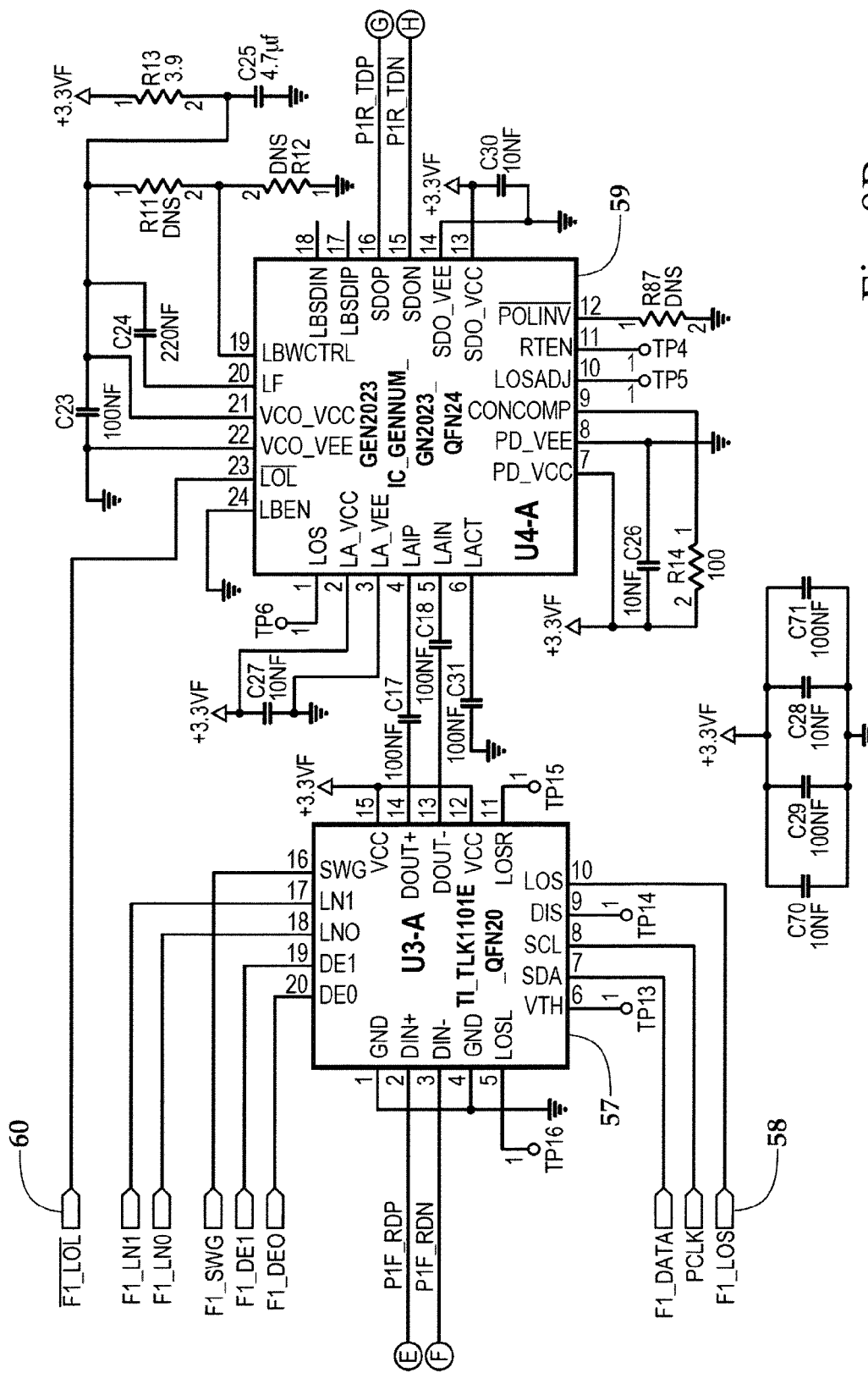
Figure 9C:
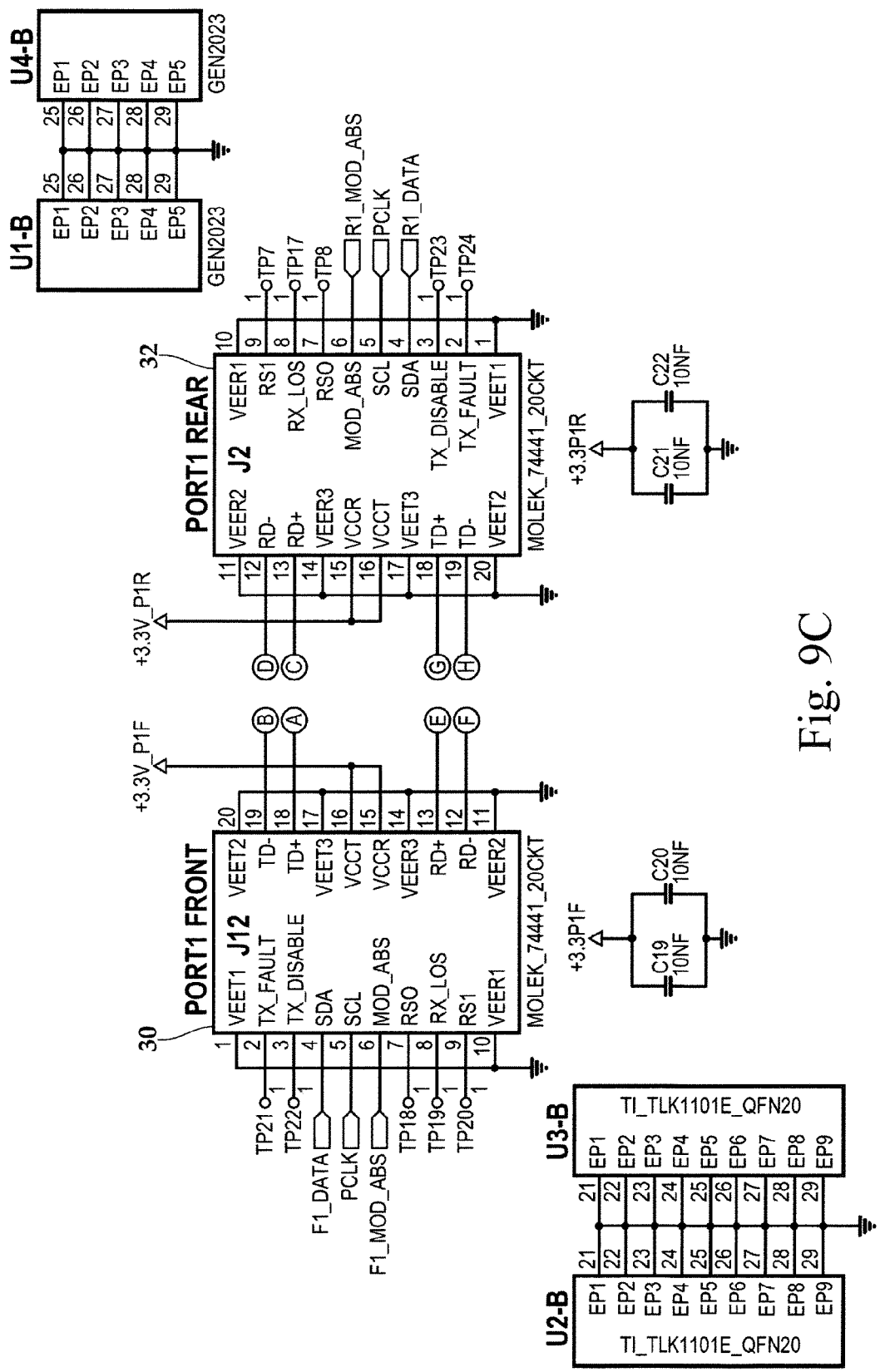
Figure 10A:
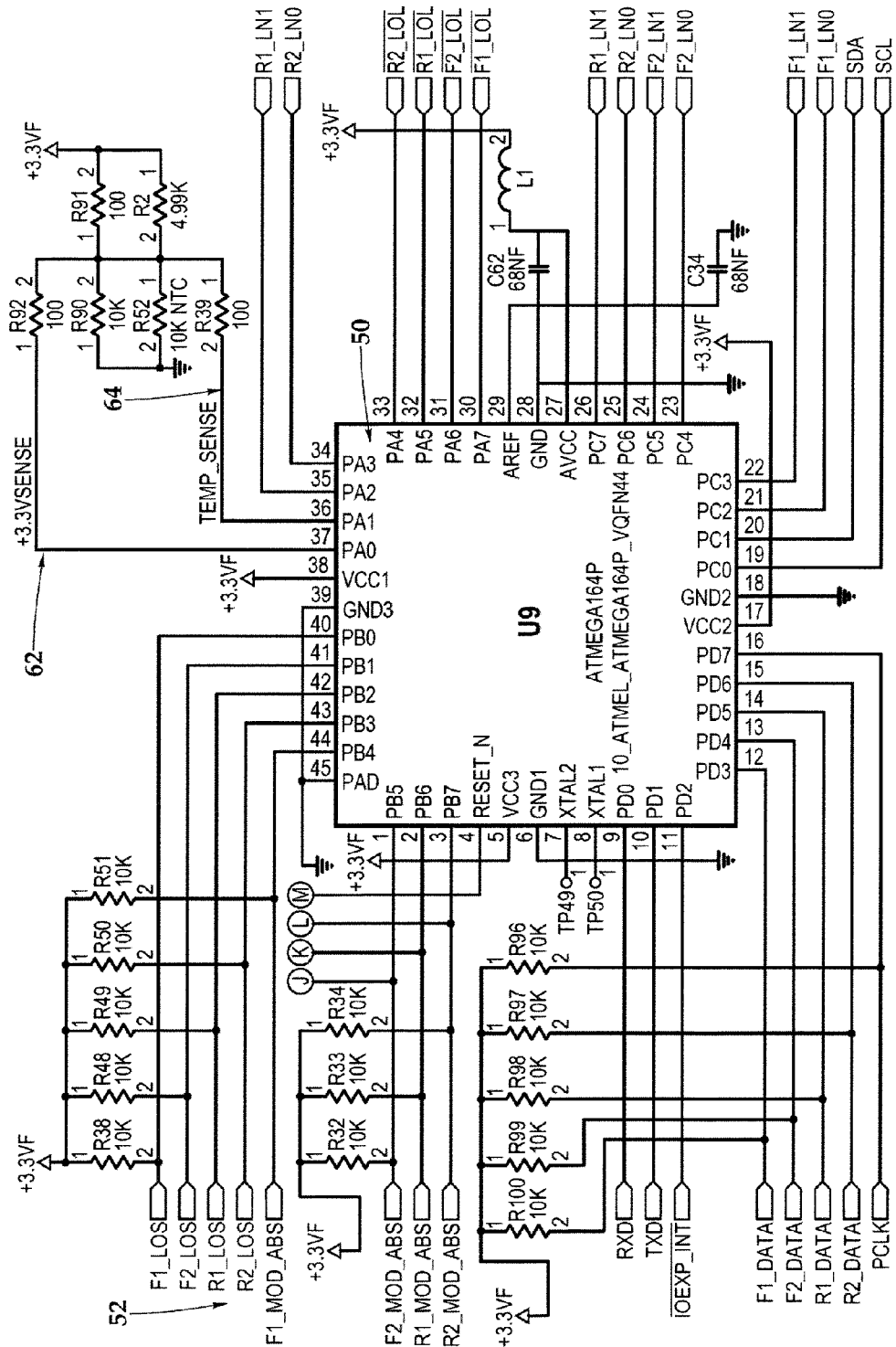
FIGS. 10A-B illustrate a partial schematic of the dual channel card assembly showing the connectivity of the line card processor/controller. Due to the size of the illustration, the schematic is shown in three figures, with the indicators J-M showing connections across different figures.
Figure 10B:
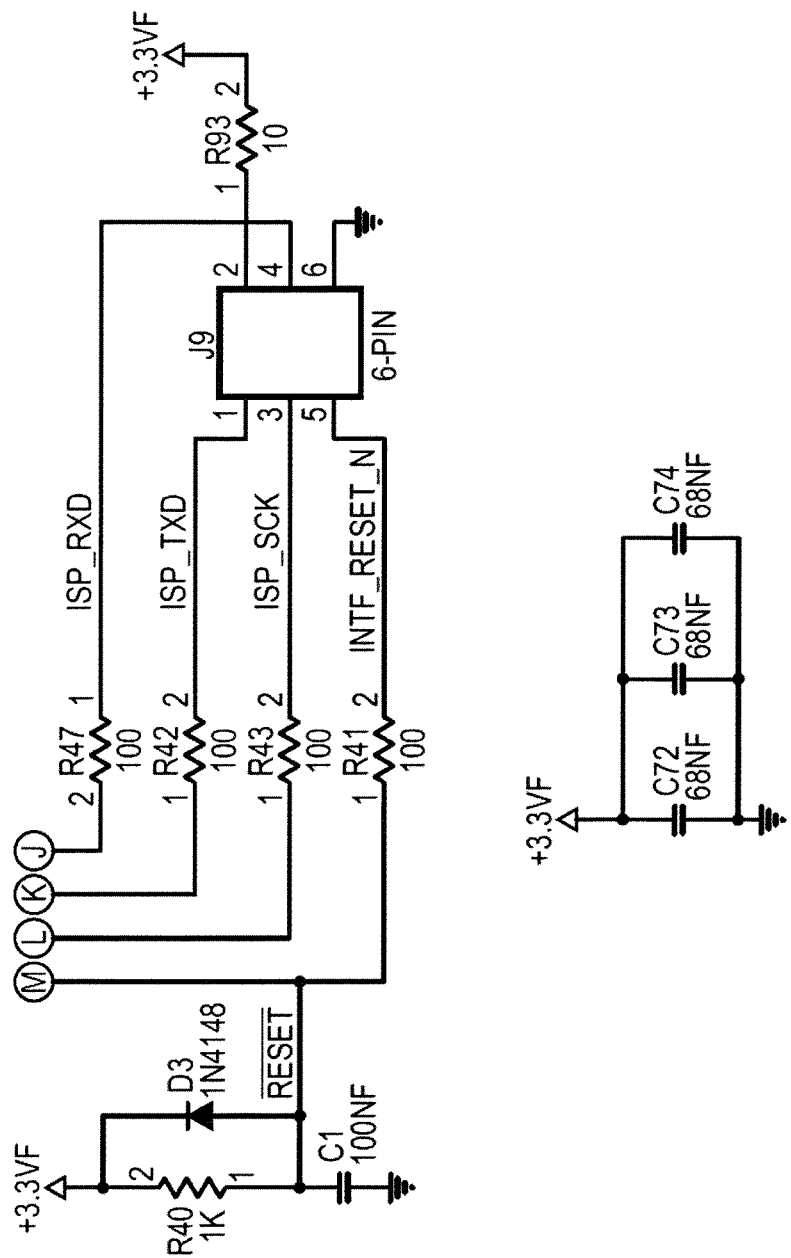
Figure 11A:
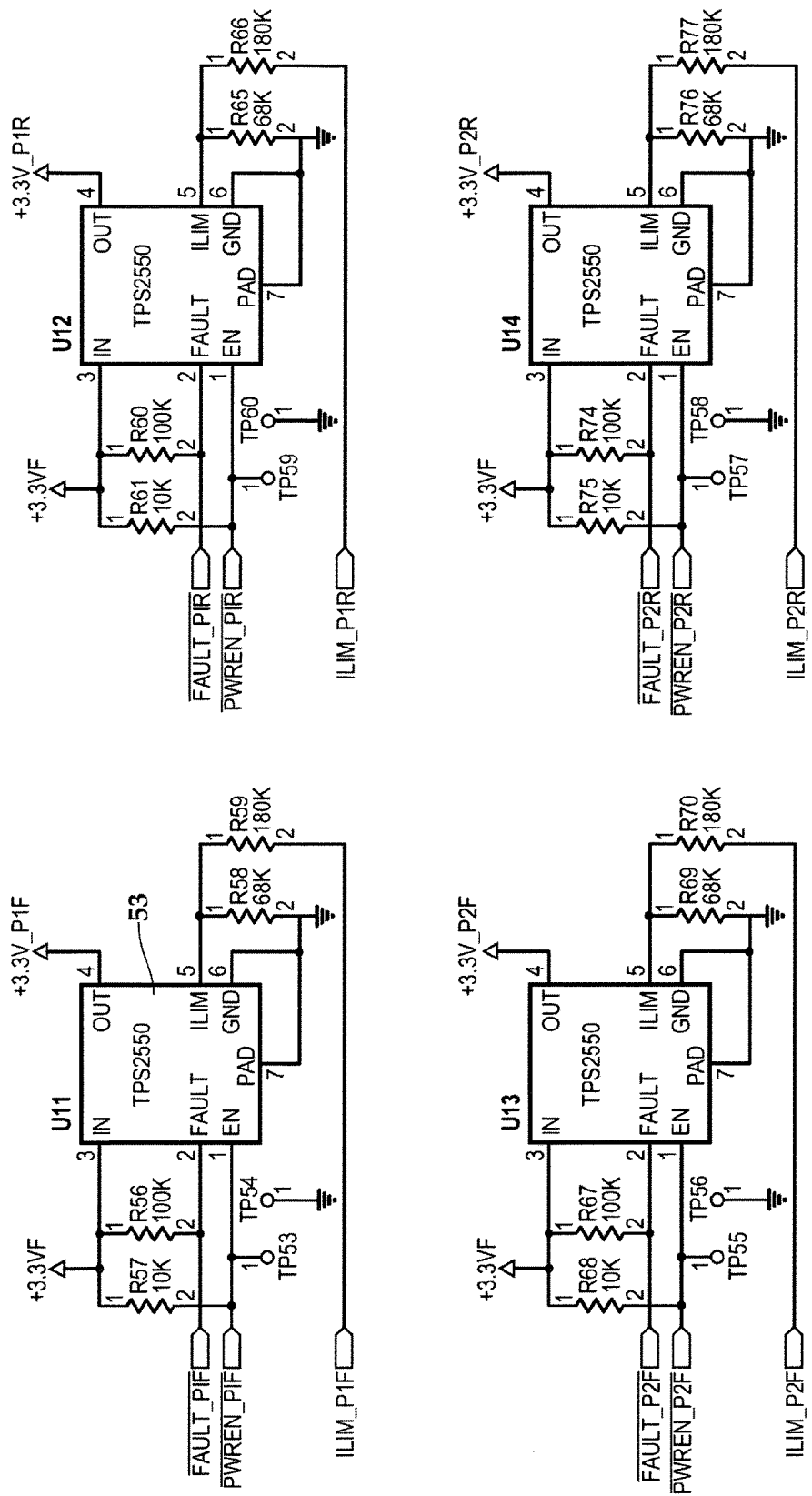
FIGS. 11A-B illustrate a partial schematic of the dual channel card assembly showing the power conditioning circuitry (i.e., power ramp up and ramp down) and the connectivity to the port's LEDs.
Figure 11B:
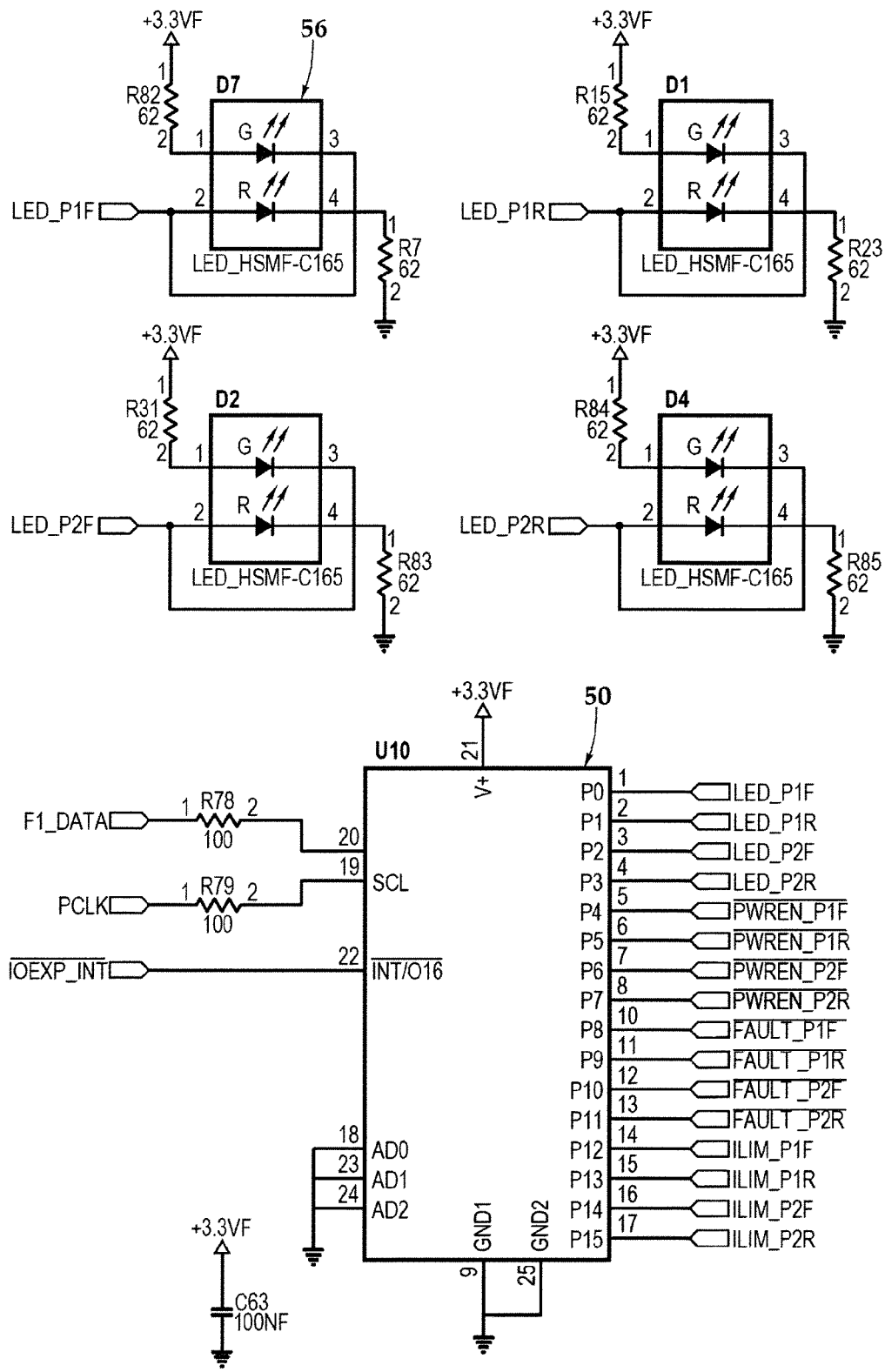

Microcontroller 50 can include, or be otherwise connected to, a computer readable medium such as RAM, ROM, EPROM, EEPROM, flash memory, magnetic and/or optical storage devices, and the like, with instructions to perform the following method steps. At power up step S100, the microcontroller 50 on the dual channel assembly 28 monitors S102 the status of the MOD_ABS signal 52 coming from the SFP+ port 30. This MOD_ABS signal is defined by the SFP+ standard SFF-8431 to be a logic high when no SFP+ device is present in the port and pulled to a logic low by the SFP+ device upon insertion into the port. An SFP+ device is defined as a module or plug compliant with the SFP+ electrical and mechanical industry standard. Once a logic low is detected S104 by the microcontroller, appropriate current limiting is enabled and DC power to the port is enabled S106 via a power management system 53. An LED 56 is configured S108 by the microcontroller to provide visual information regarding the status of the port and/or the panel. The microcontroller proceeds to read S110 detailed information from the memory that resides internal to the device inserted into the port. The memory content present in the ID chip in FIG. 12 in the SFP+ device is outlined by an industry standard to provide consistency between all SFP+ devices. The relevant information read pertains to device type (e.g., passive copper cable, active copper cable, fiber optic transceiver, wireless device) as well as other necessary information (e.g., cable length, serial number, manufacturer). These details then can be reported S112 by the microcontroller to another patch panel unit management processor (not shown) residing on the backplane PCB 40 through power/data connectors 38A, 38B that interface the dual channel assembly to the backplane PCB. This information is also used by the microcontroller to adapt the equalization, provided by the equalizer 57, and the pre-emphasis, provided by the CDR/pre-emphasizer 59, settings as needed based on device type and cable length in step S114. The equalization and clock recovery functions employ a dynamic adjustment to a threshold voltage level that demarks what is a logic value of a one or a zero. This digital decision threshold ensures error-free operation over different media types and lengths, also in step S114. The microcontroller then proceeds to monitor S116 the loss of signal (LOS) 58 and loss of lock (LOL) 60 status of the high speed data path associated with the port and report S118 it back to the processor on the backplane. At the same time, the microcontroller is also monitoring S120 the DC voltage 62 and the temperature 64 on the dual channel card assembly and reporting it back to the processor on the backplane. As long as a device remains inserted into the port, which is determined by monitoring S121 the MOD_ABS signal from the SFP+ port, the microcontroller continues to monitor and report the LOS and LOL status. The removal of an SFP+ device from the port is detected S122 by the microcontroller via the MOD_ABS signal returning to a logic high, at which point the microcontroller disables S124 DC power to the port, configures S126 the LED, and reports S128 the status to the processor on the backplane. The port is then in its original configuration, as in step S102. The same functional implementation is implemented for all 24 ports in the patch panel. Partial schematics for assembly 28 are shown in FIGS. 9-11. Each SFP+ port receives a signal and transmits a signal.

The embodiment shown in FIGS. 8A-11 illustrates one form of the present invention, and the present invention can be realized in other ways by one skilled in the art, and still stay within the spirit and scope of the present invention. For example, the functional blocks of FIG. 8A can be combined in different ways to produce an active patch panel according to the present invention, and/or functional elements can be deleted and/or added. Likewise, and referring to FIGS. 9-11, there are alternative integrated circuit selections that can be made within the spirit and scope of the present invention to produce an equivalent active patch panel according to the present invention, and/or the circuit components can be combined in a single or multiple application specific integrated circuits (ASICs), field programmable gate arrays, etc. For the embodiment shown, the following ICs can be used: Pre-emphasis plus CDR—Gennum GN2023, 9.95-11.3 Gb/s Limiting Amplifier plus Clock and Data Recovery (qty 4, 1 per port), http://www.gennum.com/data/products/GN2023; Equalization—Texas Instruments TLK1101E, 11.3 Gb/s Cable and PC Board Equalizer (qty 4, 1 per port), http://focus.ti.com/docs/prod/folders/print/tlk1101e.html; Power Management—Texas Instruments TPS2550, Adjustable Current-Limited Power-Distribution Switch, (qty 4, 1 per port), http://focus.ti.com/docs/prod/folders/print/tps2550.html; Microprocessor/controller—ATMEL ATMEGA 164P, AVR 8-bit RISC Microcontroller (qty 1, 1 per dual channel card), http://www.atmel.com/dyn/Products/product_card.asp?part_id=3887.

In one embodiment, the chip components and the mating connector are first assembled in an automated surface mount technique (SMT) process, followed by a manual insertion of the (through-hole) cages for a snap fit. In another embodiment, all chip and connector and cage (surface mount) components are assembled in an automated SMT process.

The functional blocks generally at 44 in FIG. 3 can provide backplane power management, control functions, expansion capability, and administrative features to monitor traffic access utilization, provide data for load balancing, and incorporate PoE power.

The backplane has the following functions:
 1. Provide two input power ports to increase reliability.
 2. Provide conditioned power to each of the dual channel assemblies.
 3. Provide communication channels between the dual line cards' processors and the panel processor.
 4. Provide an Ethernet (RJ45) or other interface (e.g., USB) for a network connection (and web server) to the Local Area Network (LAN).
 5. Provide a management function for the panel.
 6. Provide a panel status LED.

The backplane PCB can also feature additional connectors (not shown) that provide the following:
  DC power input 12V (or 48V, 5.5V or 3.3V) jack;
  RJ-45 jack for supervisory/administration capability;
  RJ-45 jack for Power over Ethernet (PoE) capability (e.g., DC power from a PoE source equipment can be utilized to power the panel);
  USB (2.0/3.0) for supervisory/administration capability.

Figure 12:
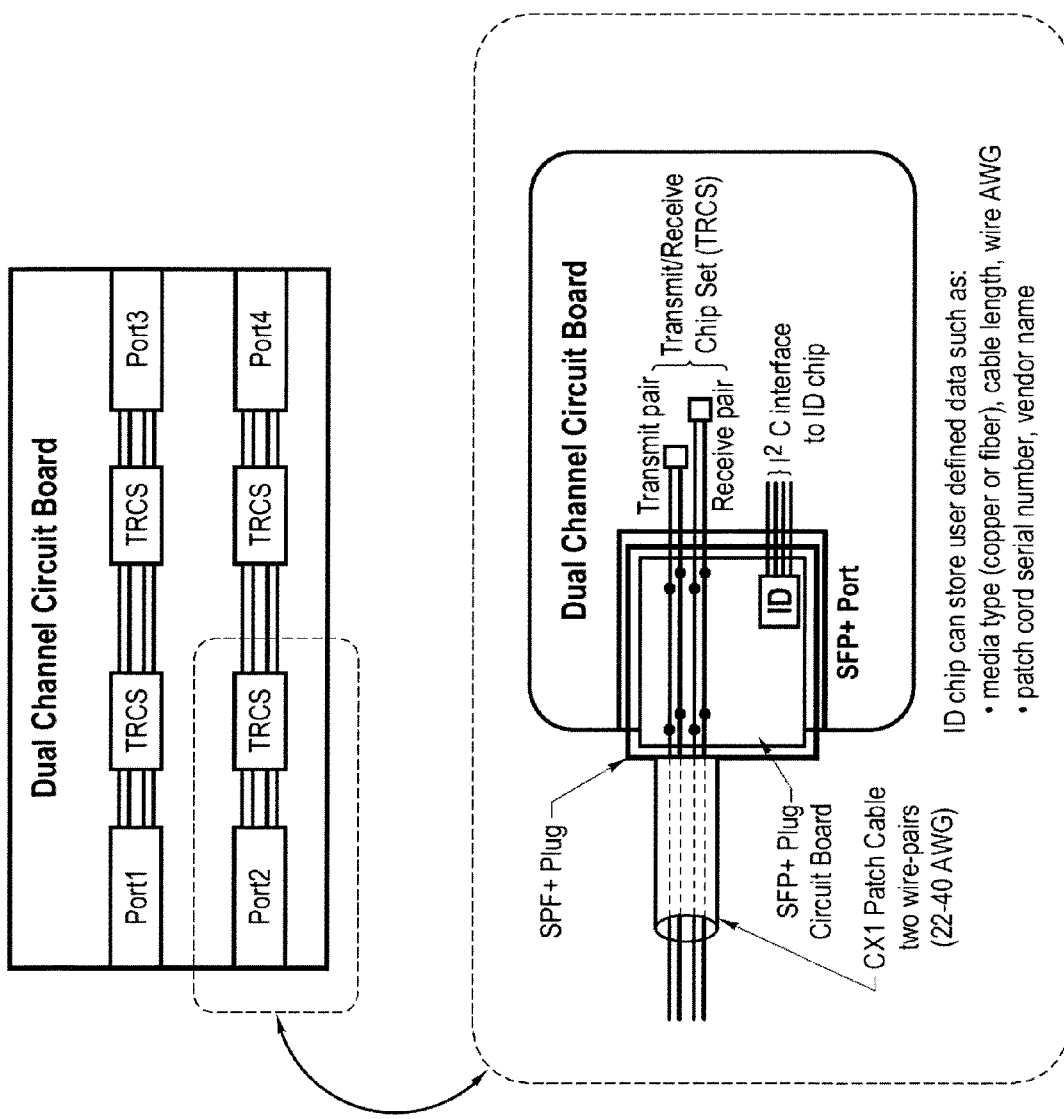
FIG. 12 is a block diagram of a port on the dual channel card assembly circuit board showing an ID chip mounted on a circuit board within the plug of a passive copper SFP+ cable.
Figure 13:
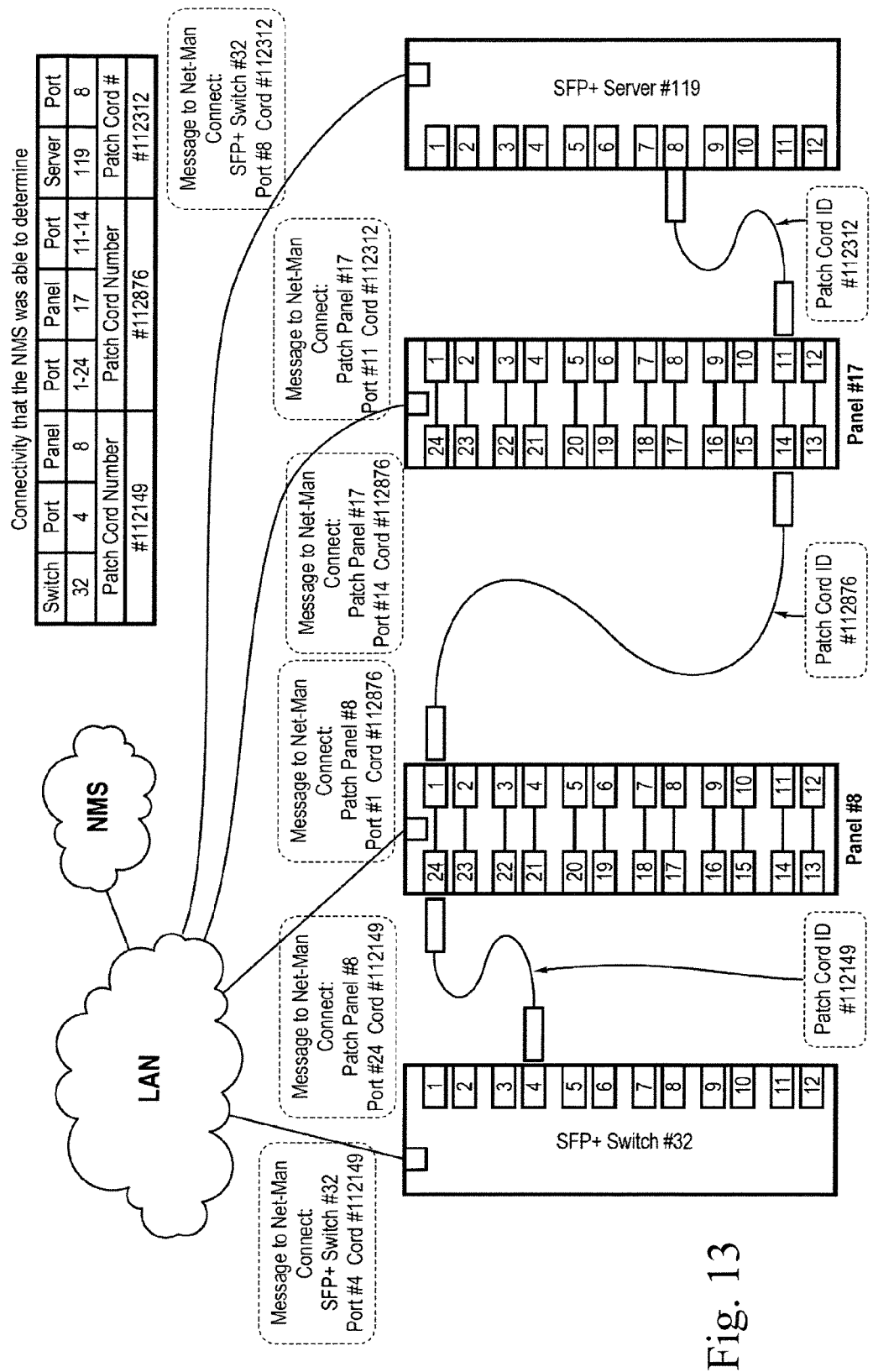
FIG. 13 is a system block diagram of a cross connect configuration of a SFP+ connection between a switch and a server.

FIGS. 12 and 13 depict how the panel can provide physical layer management. FIG. 12 shows an SFP+ patch cable and a panel port, in a detail view of a dual channel circuit board. Shown on the dual channel circuit board are transmit and receive chip sets (TRCSs), each of which is comprised of an equalizer and a CDR element. The SFP+ cable has a programmable ID chip built into each plug in which a unique patch cord serial ID number can be written. When a patch cable is inserted into a port, the patch cord serial ID can be read by the dual channel circuit board and reported to a Network Management System (NMS) (i.e., an intelligent physical layer management system) through a processor (not shown) that can be mounted on the backplane or on the dual channel circuit board and connected (through the appropriate hardware) to an Ethernet switch that has connectivity to the Network Manager. FIG. 13 shows how the NMS can determine network endpoint to endpoint connectivity in more detail. When two panel ports respond to the NMS that the same patch cord serial number was inserted, it can be assumed that a connection between the two ports has been established. In this fashion, physical layer management can be performed. For example, when a patch cord (of serial ID#112876) is inserted into Panel #8 (an active patch panel according to the present invention), Panel #8 responds to the NMS with a message that reports that a patch cord of serial ID#112876 was just inserted into Port #1 of Panel #8. When the other end of the patch cord (of serial ID#112876) is inserted into Panel #17 (another active patch panel according to the present invention), Panel #17 responds to the NMS with a message that reports that a patch cord of serial ID#112876 was just inserted into Port #14 of Panel #17. The NMS can now easily determine that there is now connectivity between Port 1 of Panel #8 and Port 14 of Panel #17 via patch cord #112876. The entire end to end connection can be reported in a similar fashion. FIG. 14 illustrates how the panel port LEDs can assist installers in patch cord management. In FIG. 14(A), the front face of the panel is shown (the rear face is similar with the exception that the port numbers vary from 13 to 24). The LEDs above each port can be illuminated red or green or both to form an amber color (also the LEDs can be flashed on and off). These LEDs can be turned on or off via the NMS. Note that patch cords can plug into the front or the rear side of the panel and when an insertion or removal occurs a message is sent to the NMS. With this capability, the NMS can direct an installer via these LEDs to insert or remove patch cords.

Figure 15:
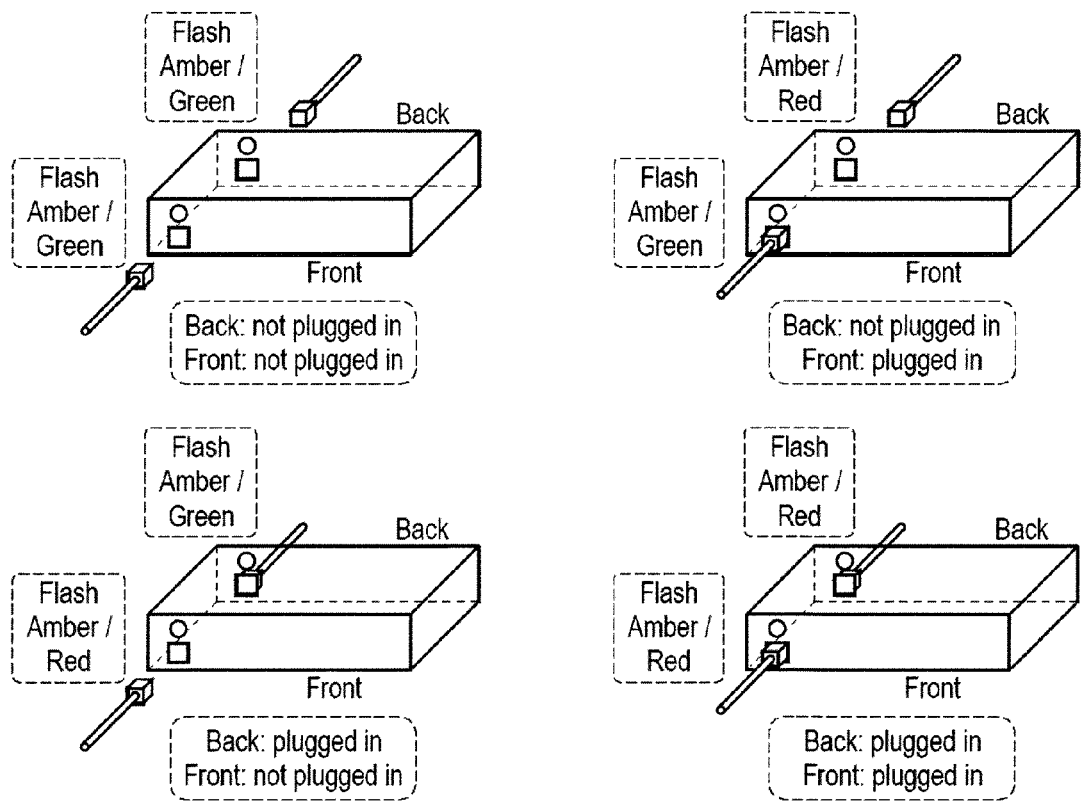
FIG. 15 is a schematic which describes a capability that aids an installer or user in understanding what is connected to the opposite side of a unit.

FIG. 15 shows how the panel LEDs can assist installers in connectivity management. A problem can exist in installing cables where the back side port may or may not be observable in that one cannot tell if the back side port has a cable plugged in or not. The panel has a feature built-in where the status of the opposite side port is observable through the observed side port LEDs. FIG. 15 shows how this can assist an installer.

Figure 16:
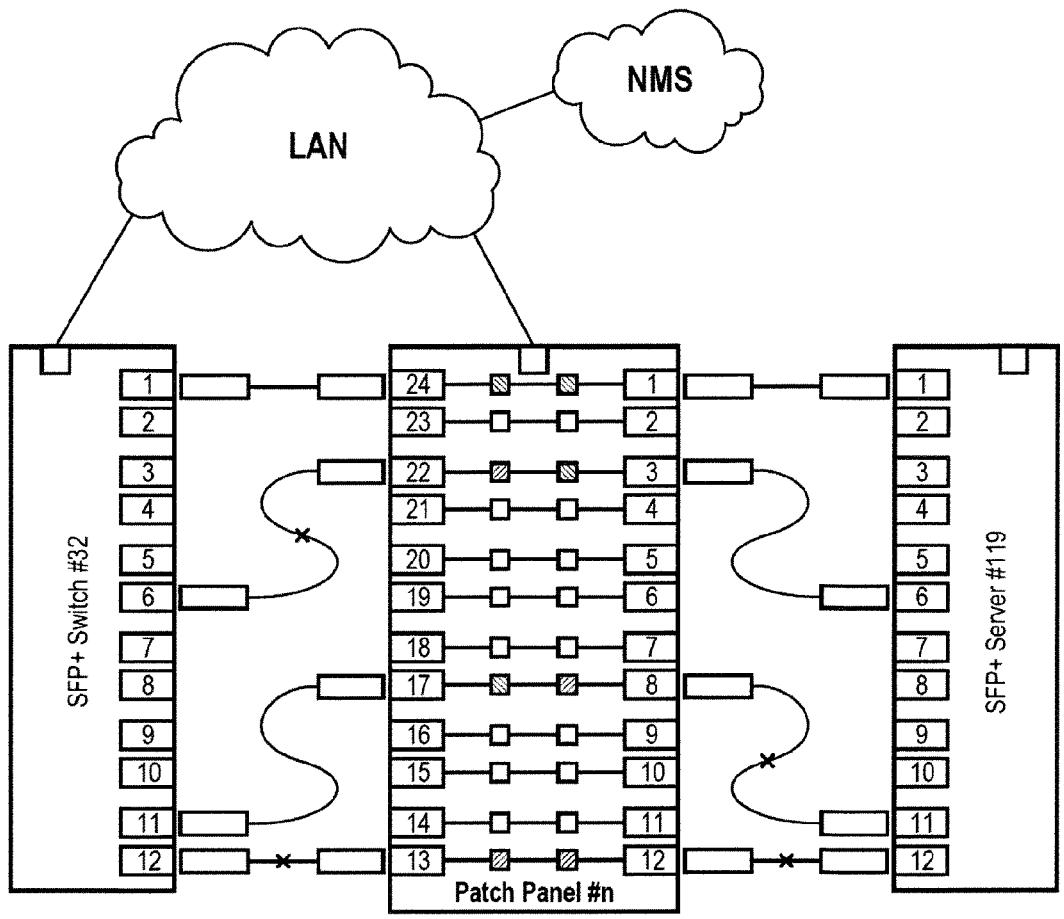
FIG. 16 is a schematic which describes how the panel can assist in fault isolation.

FIG. 16 conveys how the TRCS can help isolate faults, by monitoring Loss of Signal (LOS) and Loss of Lock (LOL) within the TRCS's. Each TRCS can monitor the transmit and receive communication signal of the port it is connected to; hence, if a patch cord was severed, the TRCS would detect loss of signal and would report a failure on that port. The panel is capable of reporting faults occurring upstream towards the switch or downstream towards the server side of the communication link. This information is useful for fault isolation and reporting. Additionally the ports can be turned on or off by management control (e.g., from the NMS) as well as providing a loop back to aid the installer in link installation and diagnostics. Connectors meeting the SFP+ connector standard are suitable for copper and optical connectivity. The ports can accept either a copper patch cord or a fiber patch cord with a transceiver plugged into the port. Consequently the active patch panel can support either copper or optical patch cords plugged into it. Hence if a longer connection is required for some of the ports of a panel, fiber patch cords can be utilized.

Figure 17:
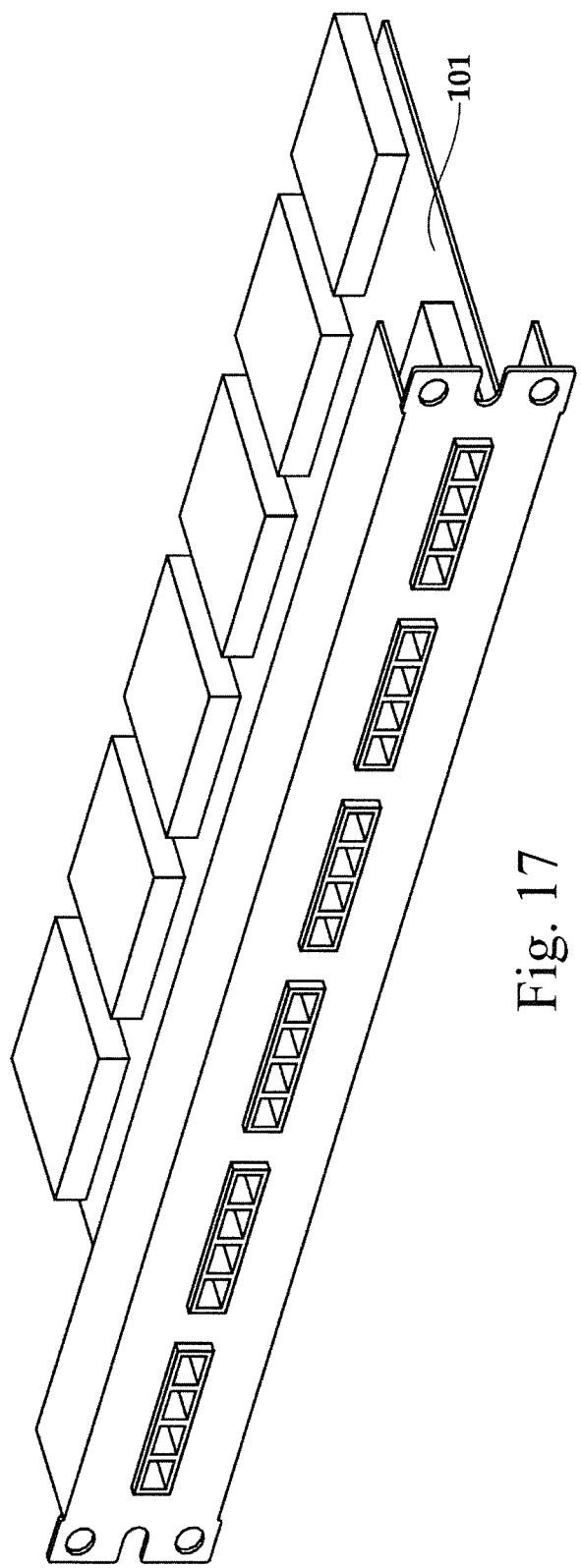
FIG. 17 is a perspective view illustrating a higher density implementation of a patch panel, particularly a multi-quad channel line card forming a 24-channel (48-port) patch panel.

An SFP+ patch panel solves some key problems. These problems/solutions include:
  Length extension
    Through the introduction of a repeater within the patch panel
    Through optimization of equalization and pre-emphasis within the patch panel
    Added length of cabling allows for greater flexibility of architectures (e.g., TOR, EOR)
  Structured cabling
    Simplifies the interconnection of equipment within the data center by promoting the connection of equipment to the active SFP+ patch panel within the rack or cabinet. Cabling from one rack or cabinet to another is routed overhead or underfloor for optimal installation and subsequent moves, adds and changes (MACS).
    Improves accessibility and rapid moves adds and changes
  Provides loop back capability for fault sectionalization. This can be achieved by way of control of the TRCS to, for example, connect the transmit signal of Port 1a in FIG. 7 to the receive port of Port 1a at the TRCS instead of to the transmit port of Port 1b. In this way, loop-back functionality through Port 1a could be accomplished. Similarly, all other ports could be provisioned with this feature under suitable control.
  Support for active copper cables or optical cables or combinations thereof. The SFP+ interface supports both media, typically by using an optical-to-electrical module in the case of the optical solution, where the electrical interface of the SFP+ module fits into the SFP+ receptacle in the active patch panel. In the copper cable case, the copper twin-axial cable is connected directly to the electrical interface within the SFP+ plug that would be fitted into the SFP+ receptacle
  The present invention provides a foundation for alternate form factors (QSFP, XFP, QSFP+, . . . ) and higher data rate technologies (e.g., 40/100 Gbps Ethernet). These form factors are each pluggable interfaces amenable to the concepts described in this application and are supported for both copper and fiber media.
  The active patch panel unit is capable of patch cable guidance/management and reporting of physical connectivity via a management port, by way of the previously described port switch on/switch off feature.
  The SFP+Active Patch-Panel enables:
  Structured cabling
    Inclusion of patch panels to allow conveniently located cable assemblies from, for example, a switch to a first patch panel, and from a server to a second patch panel. These cables act as patch cords in a conventional structured cabling system. The two patch panels are connected by means of cabling typically installed in overhead or underfloor trays. In this way, the switch to server cabling is comprised of the connection of three assemblies. The cable assembly between the patch panels can be considered as the horizontal cable segment.
    Clear demarcation of cabling segments
    Easy to change configuration via patch cord movement versus a point to point cabling configuration.
    Faster and more convenient switch port change-out in the event of a switch port failure. The patch cord can be connected to an alternative, functioning port on the switch, more easily than would be the case in the point-to-point architecture.
  Channel Length Extension
    Panels can be cascaded together via:
      passive copper cables
      active copper cables
      optical cables
  Patch Cord Management
    Provides moves adds & changes (MACs) useful for physical layer management
  Connection Management
  Cable Media Type Flexibility
    Each SFP+ patch panel, and more specifically the dual channel card assemblies, supports copper or optical fiber media
  The patch panel forms a regenerative channel or repeater by interfacing between one port (copper or fiber based SFP+ cabling) and another port (copper or fiber based SFP+ cabling). An estimate for the cost of this solution is approximately 1/10 the cost/port of a switch. Another advantage of the SFP+ patch panel of the present invention is that it has a modular design which is scalable. The design is capable of supporting various numbers of ports per patch panel simply by not populating all of the modular port card positions or slots. In some embodiments, users can increase or decrease the number of ports in a patch panel by inserting or removing port cards at the patch panel. These port cards can be single, dual, tri, quad, or n in size, where n is an integer. This concept can also be applied to a stacking SFP+ interface for still higher densities. A design incorporating 24 channels on a large board 101 is shown in FIG. 17.

In one novel aspect the present invention includes an SFP+ active patch panel with a housing which has a first face and an opposing second face. A plurality of channels extend between the first face and the second face. Each channel includes a first port at the first face electrically connected to a second port at the second face. Each of the channels further has an equalizer, a CDR element and a pre-emphasis element connected between the corresponding first and second ports. The channels further include a controller connected to the plurality of channels where the controller has a computer readable medium (memory) which can be accessed by a RJ45, or USB, or similar port for management functions. The computer readable medium stores information regarding the cable media parameters (e.g., length, media type, wire gauge, data rate, manufacturing vendor) used to determine equalization/pre-emphasis of a plurality of cable assemblies in the same channel. According to the present invention, the cable assemblies can have different lengths; and a management port can be connected to the controller. In some aspects, the cable assemblies are a twin-ax type and/or a fiber optic type.

In another novel aspect the present invention includes a structured cabling system with a plurality of SFP+ cable assemblies, with at least one SFP+ active patch panel connected to the plurality of SFP+ cable assemblies.

In yet another novel aspect the present invention includes an active patch panel which has a housing configured for connection to a rack unit, where the housing has a first face and an opposing second face. A backplane is provided within the housing and includes a power bus with electrical power. A plurality of channels extend between the first face and the second face and electrically connect to the backplane. Each channel has a first port at the first face electrically connected to a second port at the second face. Further, each channel has an equalizer, a CDR element, and a pre-emphasis element connected between a corresponding first port and second port. A controller is connected to the plurality of channels, where the controller has a computer readable medium. The computer readable medium includes instructions for determining the presence of at least one connector, where each connector includes a module type (copper or fiber media); enabling the provision of electrical power to at least one connector; current limiting the electrical power to at least one connector; reading a corresponding module type for each of the connectors; and adapting an equalization setting to the equalizer and a pre-emphasis setting to the pre-emphasis element for at least one connector based on a corresponding module type. The instructions can also have a step for monitoring a presence and/or an absence of at least one connector inserted into the ports. The electrical power can be a DC power, or other power type.

In yet another novel aspect the present invention includes a structured cabling system with a plurality of cable assemblies and at least one active patch panel connected to the plurality of cable assemblies. The active patch panel has a housing configured for connection to the rack unit, and the housing has a first face and an opposing second face. A backplane is connected to the housing with a power bus that has electrical power. A plurality of channels extend between the first face and the second face and are electrically connected to the backplane. Each channel includes a first port at the first face electrically connected to a second port at the second face. Each channel further has an equalizer, a CDR element, and a pre-emphasis element connected between a corresponding first port and second port. A controller is connected to the plurality of channels, and the controller has a computer readable medium. The computer readable medium includes instructions for: determining the presence of at least one connector, each connector including a module type; enabling the electrical power to at least one connector; current limiting the electrical power to at least one connector; reading a corresponding module type for each connector; and adapting an equalization setting to the equalizer and a pre-emphasis setting to the pre-emphasis element for at least one the connector based on a corresponding the module type. The computer readable medium can also have instructions for monitoring a presence and/or an absence of at least one connector inserted into the ports.

In yet another novel aspect the present invention includes a method of operating an active patch panel which includes a plurality of channels, where each channel has a first port electrically connected to a second port. For at least some of the ports in the active patch panel the method includes the steps of: determining the presence of at least one connector; enabling electrical power to at least one connector; current limiting the electrical power to at least one connector; reading a module type of at least one connector; and adapting an equalization setting and a pre-emphasis for at least one connector based on a corresponding the module type. The method can further include the step of monitoring a presence and/or an absence of at least one connector in the ports.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method of operating an active patch panel including a plurality of channels, each said channel including a plurality of ports, said plurality of ports including a first port electrically connected to a second port, for at least some of said ports in said active patch panel the method comprising the steps of:
    determining the presence of at least one connector;
    enabling electrical power to said at least one connector;
    current limiting said electrical power to said at least one connector;
    reading a module type of said at least one connector; and
    adapting an equalization setting and a pre-emphasis for said at least one connector based on a corresponding said module type.

2. The method of claim 1, further comprising the step of monitoring at least one of a presence and an absence of said at least one connector insertion into said ports.

3. The method of claim 1, wherein said electrical power is a DC power.

* * * * *